United States Patent [19]

Lucas

[11] 3,961,718
[45] June 8, 1976

[54] SELF-LOADING AND SELF-UNLOADING TRAILER

[76] Inventor: Gustave Lucas, Route de Saint-Aubin, La Verrie (85), France

[22] Filed: Jan. 2, 1974

[21] Appl. No.: 429,944

Related U.S. Application Data

[63] Continuation-in-part of Ser. No. 245,368, April 19, 1972, abandoned.

[30] Foreign Application Priority Data

| | | |
|---|---|---|
| Apr. 20, 1971 | France | 71.14872 |
| Nov. 10, 1971 | France | 71.41931 |

[52] U.S. Cl. ................. 214/520; 56/364; 198/9; 214/83.14
[51] Int. Cl.² ............................................. B60P 1/00
[58] Field of Search .............. 214/518, 520, 83.14; 198/9, 36; 187/9; 83/26; 56/364

[56] References Cited
UNITED STATES PATENTS

| | | | |
|---|---|---|---|
| 2,089,516 | 8/1937 | West et al. | 198/9 X |
| 2,696,375 | 12/1954 | Huff | 198/9 |
| 2,862,598 | 12/1958 | Oswalt | 198/9 |
| 3,061,047 | 10/1962 | Gunning | 187/9 X |
| 3,211,308 | 10/1965 | Glass | 214/518 |
| 3,263,846 | 8/1966 | Balbi | 214/518 |
| 3,613,344 | 10/1971 | Weichel | 56/364 |
| 3,687,322 | 8/1972 | Stieren | 214/520 |

FOREIGN PATENTS OR APPLICATIONS

| | | | |
|---|---|---|---|
| 3,916 | 8/1904 | France | 214/518 |

*Primary Examiner*—Frank E. Werner
*Assistant Examiner*—Donald W. Underwood
*Attorney, Agent, or Firm*—Bacon & Thomas

[57] ABSTRACT

An apparatus to be adapted to an agricultural trailer characterized by the fact that it allows the loading and unloading thereof without the need for any other engine or any labor by using only the motive power of the tractor to which it is hitched, the loading being carried out by picking up the product from the ground or from a silo and the unloading being carried out laterally or rearwardly of the trailer. The apparatus comprises a horizontal travelling endless conveyor mounted on the bottom of the trailer and a mechanical feeding and discharging vertical conveyor mounted on the trailer to load the product through its open top on the horizontal conveyor and to receive the product from the horizontal conveyor to discharge it out of the trailer.

5 Claims, 13 Drawing Figures

SELF-LOADING AND SELF-UNLOADING TRAILER

This application is a continuation-in-part of my copending application Ser. No. 245,368, filed Apr. 19, 1972, now abandoned.

The present invention generally relates to equipment for agricultural trailers hitched onto a tractor which provides the mechanical power necessary to operate the various mechanisms constituting the said equipment.

A loading and unloading apparatus is already known which is made up of conveyor belts or of lateral chains provided with transverse bars and movable in translation from front to back and vice versa. Such an apparatus is sometimes combined with a scattering device of the toothed cylinder type pulverizing or spreading the product as it is being discharged. These various apparatus are mainly used for picking up the product after it is cut or after it is first lifted but they cannot by themselves pick up a product which is stocked in a silo whether it be, for instance, hay or fodder beets.

The apparatus according to the invention makes it possible to carry out, without the help of any other engine, the loading and unloading of a trailer on which it is secured, the loading being possible by picking the product up directly from the ground or in a silo and the unloading being feasible either from the side, the rear, or the front of the trailer.

Broadly, the apparatus of the invention comprises a horizontal travelling endless conveyor which is mounted on the bottom of the trailer and mechanical feeding and discharging means mounted on the trailer to load the product, through its open top, on the horizontal conveyor and to receive the product from the horizontal conveyor to discharge it out of the trailer.

Preferably, the apparatus according to the invention comprises a doorway over which a frame is slidably mounted which carries a lifting device and a rotor itself slidable over the frame: the frame and the rotor being vertically movable from bottom to top and top to bottom by means of two jacks. Through a chain or cable device of known type, the rotor makes a stroke 2c for each stroke c of the frame. The rotor may be made up of a sheet metal member wound as a helical screw of which the spires are provided with prongs, or else made up of an assembly of iron fittings over which knives are secured. The product which is picked up by the rotor is ejected toward the lifting device disposed frontly between the rotor and the inside of the trailer. The lifting device may be made up of two endless chains winding around pinions and on which transverse bars are secured which are provided with prongs. The lifting device may also be a belt made of flexible material and comprising prongs intended to pick up the product to be loaded and unloaded.

As an alternative, the rotor may be provided with flails, the picked up product being projected into the trailer without the help of the lifting conveyor which may be omitted in this alternative. A roof portion forming a deflector is provided at the rearward end of the trailer to avoid the product being thrown out.

The product loaded into the trailer is brought towards the front by means of a travelling conveyor provided at the bottom of the said trailer.

According to situations, unloading of the vehicle may be carried out either rearwardly, by inverting the direction of translation of the horizontal conveyor and of the lifting conveyor, either laterally at the front by means of a transfer endless screw, called Archimedean screw, located in a transverse trough and bringing the product toward a crushing and chopping mill of which the rotor, provided with knives, has ventilation blades creating the necessary flow to carry the product toward a stocking silo.

A better understanding of the invention will be afforded by the appended drawings illustrating, by way of examples, various embodiments of the apparatus made according to the present invention. In the drawings.

Figure 1:
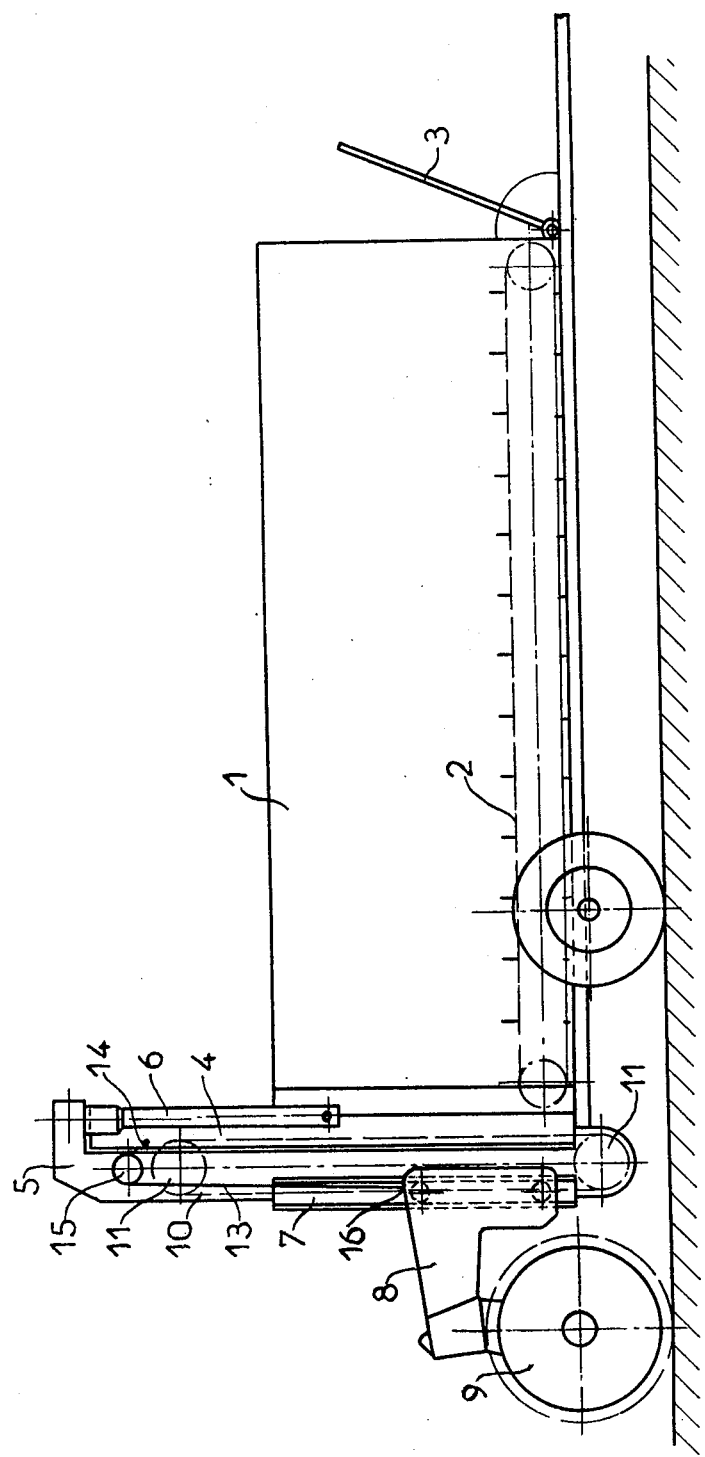
FIG. 1 is a side elevation view of the apparatus of the invention shown in combination with a trailer.

As illustrated in FIG. 1, the trailer comprises a horizontal conveyor in the form of an endless travelling belt 2 of known type intended to carry the product toward the front of the trailer during loading. At the front, a lever 3 controls the speed of translation of the belt as well as the reversal of its travelling direction. At the rear of the trailer is secured a doorway 4 of which each of the vertical side posts are formed with guiding means for the translation of a frame 5 vertically displaceable from bottom to top or from top to bottom under the action of two jacks 6 positioned laterally on the posts of the doorway. The frame 5 itself carries two side rails 7 for the sliding displacement of two terminal supports 8 of a rotor 9. A lifting device is mounted on the frame 5, being made up of two endless chains 10 each winding around two sprocket wheels 11 mounted one above the other, the chains 10 being interconnected by means of transverse bars provided with prongs 12 thus constituting a sort of conveying belt travelling in a frontal plane. The vertical translation of the supports 8 of the rotor 9 is synchronized with that of frame 5 in such a way that for a stroke c of the frame 5, the rotor 9 has a stroke 2c. This is obtained, in known manner, by means of a cable 13 of which one end is secured at 14 on the doorway, which winds around a pulley 15 located on the movable frame 5 and of which the other end is secured on the support 8 at 16. The rotor 9 may be made up of a spirally wound sheet metal member of which the spires are provided with prongs or any other projecting means allowing the abrading and pick-up of any type of products. The axle of the rotor may also be provided with knives or flails.

Figure 2:
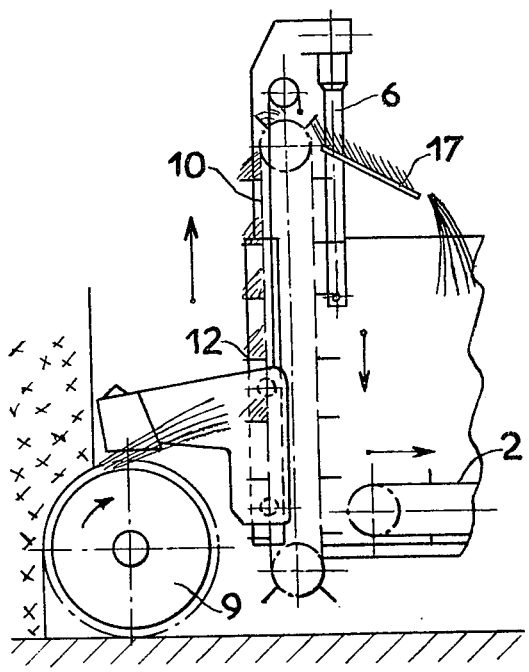
FIG. 2 is a partial side elevation view of one end of the trailer, showing the rotor applied against the base of a silo.
Figure 3:
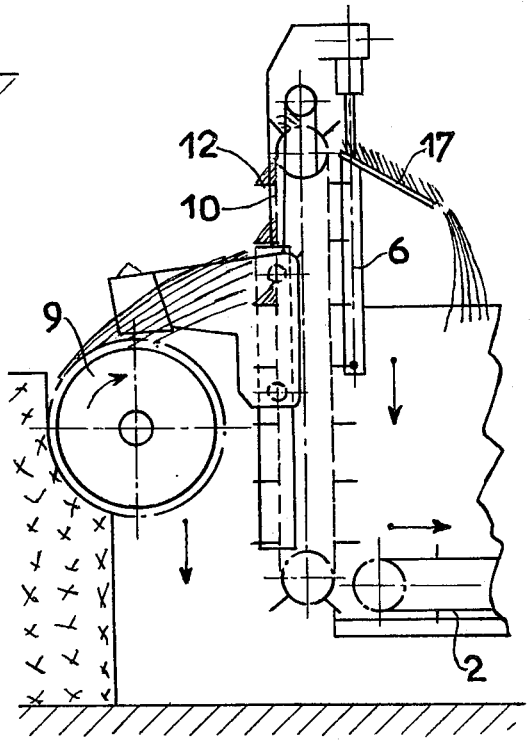
FIG. 3 is a view similar to that of FIG. 2, the rotor being however applied against the top of the silo.

FIGS. 2 and 3 illustrate the complete apparatus during loading of the trailer starting from a silo, the rotor bitting into the said silo respectively from the bottom or from the top. The product is ejected on the rising run of the lifting device or vertical endless conveyor, to be dumped into the trailer by means of a sheet metal member 17 acting as a deflector.

Figure 4:
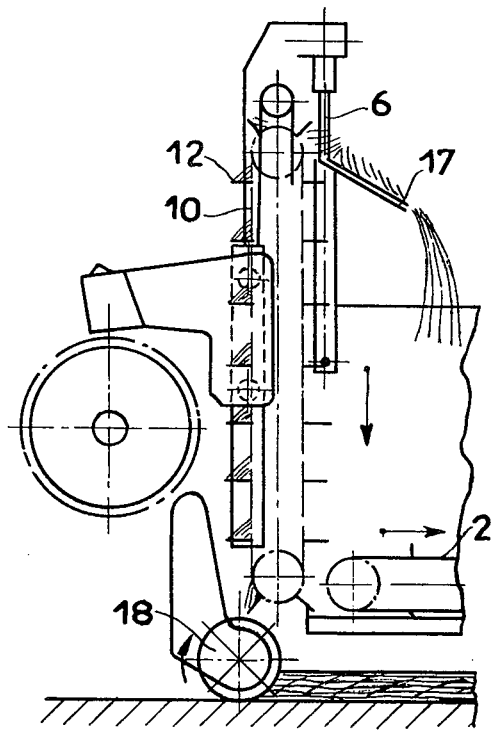
FIG. 4 is a partial side elevation view similar to that of FIGS. 2 and 3 but showing an alternative arrangement including the addition of a grass sweeping device or "pick-up", the rotor being then inoperative.
Figure 5:
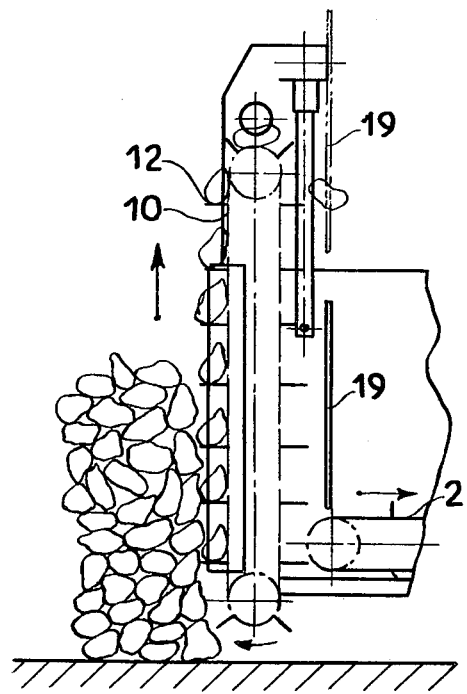
FIG. 5 is also a partial side elevation view of the apparatus showing the lifting device in action, picking up the products directly in a silo, the rotor being dismounted.
Figure 6:
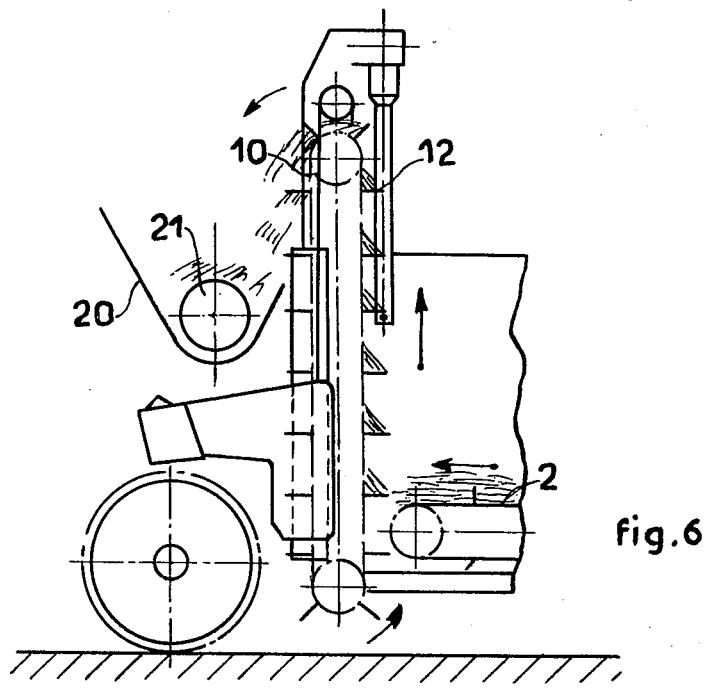
FIG. 6 is a partial side elevation view of the apparatus discharging the trailer with lateral outlet of the product by means of a spout provided with an Archmidean screw.

FIGS. 4, 5 and 6 illustrate various ways of using the trailer provided with the vertical endless conveyor travelling in a frontal plane: in these various cases, the rotor is neutralized and separate auxiliary devices of known type may be added to the trailer.

FIG. 4 illustrates the apparatus in rising position with the rotor being inoperative. It is here used to load grass that has previously been mowed by the cutting bar mounted on the tractor. Picking up the grass from the ground is obtained by means of a device of the known type called "pick-up" or grass sweeper 18 included in the present apparatus and of which the rotation at ground level causes the grass to be projected toward the lifting device.

In FIG. 5, the lifting device is used alone for directly picking up products stocked in a silo. A sheet metal plate 19 prevents the product from being driven by the downward run of the lifting device: the said plate being lifted in high position during unloading.

Unloading is carried out by inverting the movements of the various devices constituting the apparatus. It may be carried out at the rear and directly on the ground or in another vehicle, it may equally well be made laterally as shown in FIG. 6. The rotor being lowered and neutralized, the lifting device dumps the products in a spout 20 in the bottom of which a rotary endless screw 21 is driven, carrying the products to the side of the trailer as in an auger, for instance. Obviously, the endless screw may be replaced by an endless belt.

Figure 7:
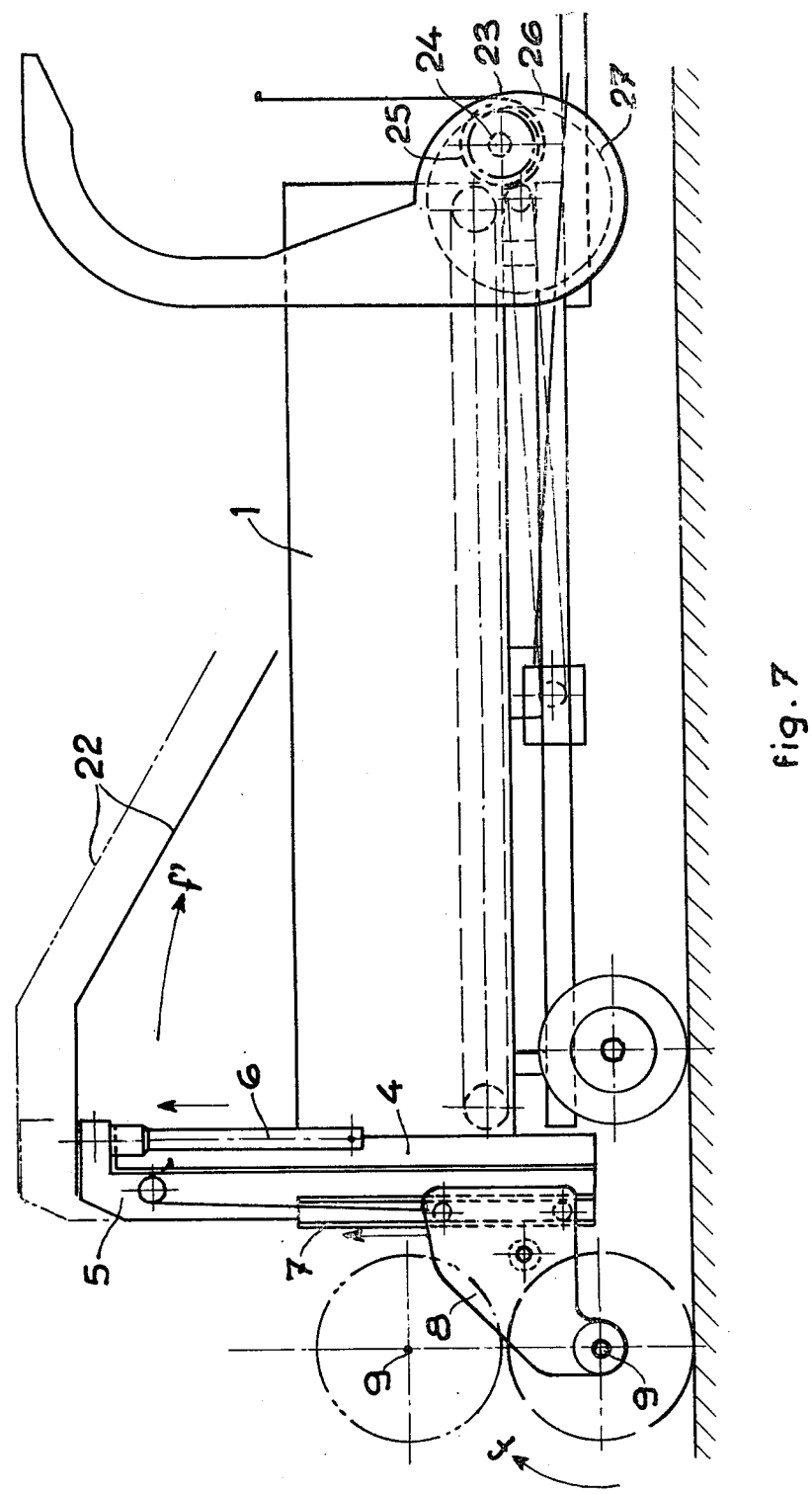
FIG. 7 is a side elevation view of a trailer shown in combination with another embodiment of the apparatus of the invention.
Figure 8:
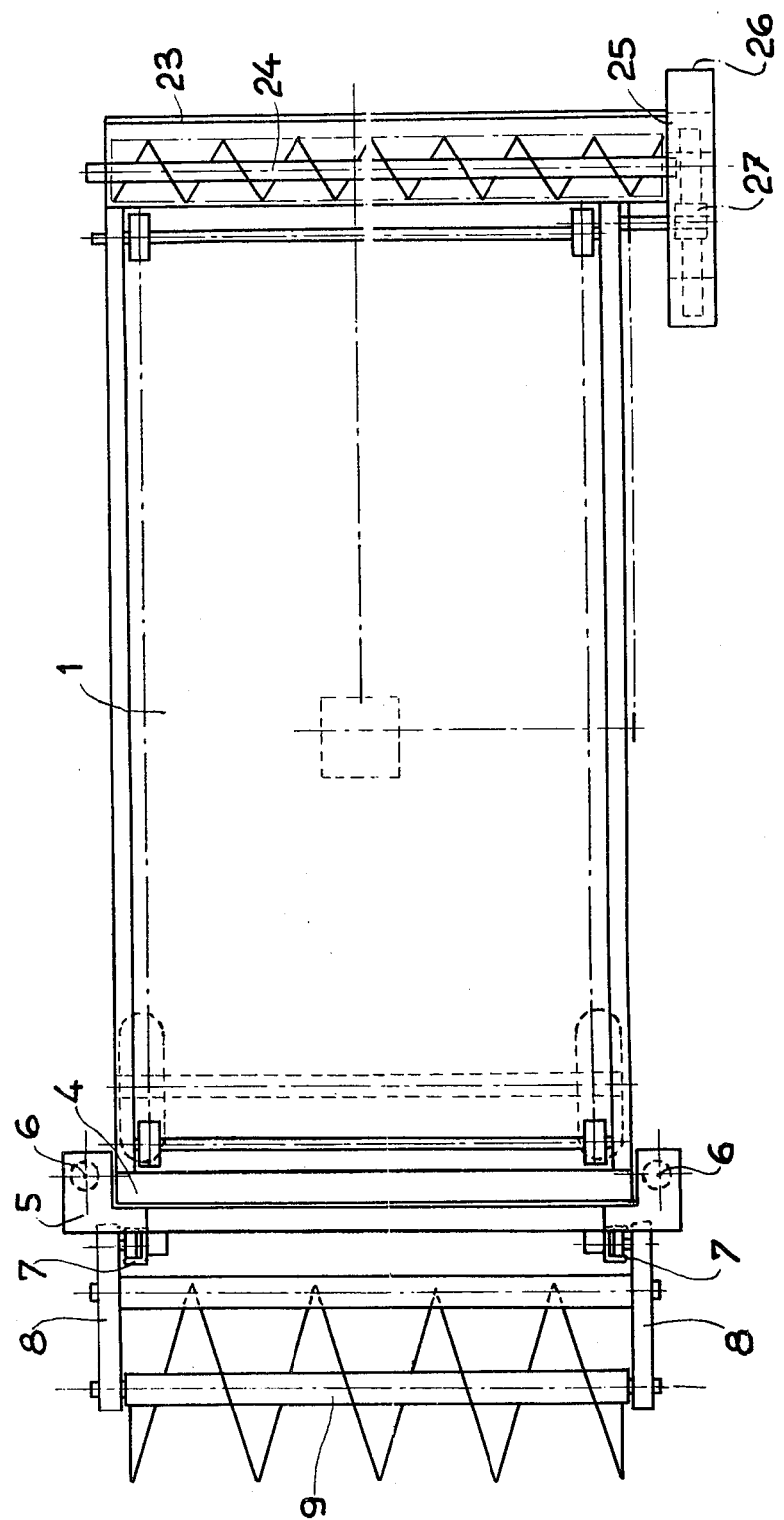
FIG. 8 is a top plan view of the trailer with the guiding chute or roof portion removed.

FIGS. 7 and 8 illustrate another embodiment of the trailer. The rear vertical conveyor described above being dismounted, the rotor 9 rotating according to the arrow *f* projects the product along the arrow *f'*. A roof portion 22 acting as a deflector is provided at the rear end of the trailer in order to avoid spillage of the product outside the trailer. This roof portion may be connected to the vertical displacement of the rotor or may simply be adjustable as to inclination.

The product thus discharged into the trailer may be carried at the front of the trailer by means of the horizontal conveyor as part of the apparatus.

In order to allow discharge of the contents of the trailer into a silo, a transverse trough 23 is provided in which a transfer screw 24 such as an Archimedean screw may be mounted for rotation. The product is thus directed through a lateral aperture 25 opening either directly outwardly or into the volute 26 of a crushing and chopping device provided with a rotor 27 having knives and ventilation blades such that the product is chopped and crushed and blown through a vertical outlet conduit 28 to be dumped into the silo, the said outlet conduit having an elbow 29 at its upper end.

In the form of the invention shown in schematic FIGS. 9 through 13, parts bearing numerals the same as those appearing on previously described embodiments may be considered to be constructed and operated in the same manner as already described. Other parts, previously shown and described with respect to other figures are not shown in schematic FIGS. 9 through 13 to avoid confusion. However, it will be understood that these parts are part of the embodiment described therein.

Figure 10:
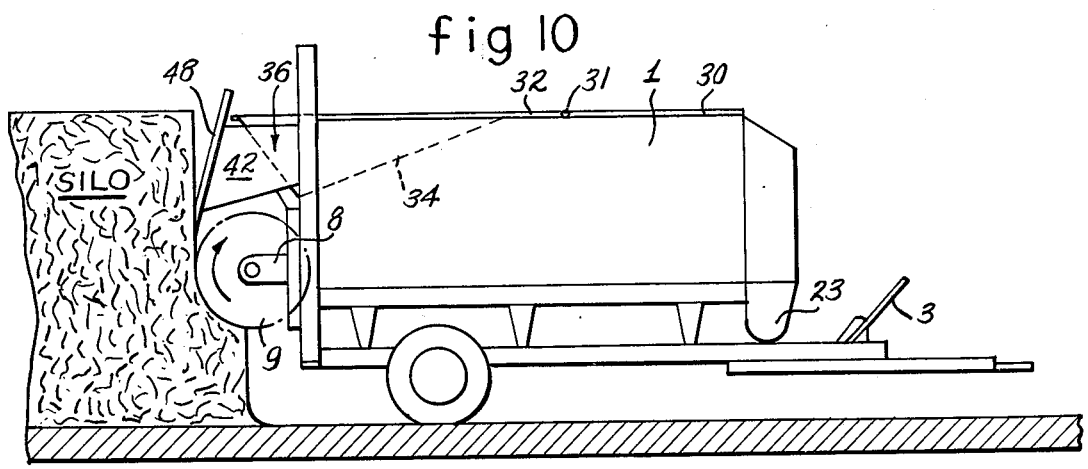
FIG. 10 is a view similar to FIG. 9 but showing the parts in different relative positions.
Figure 11:
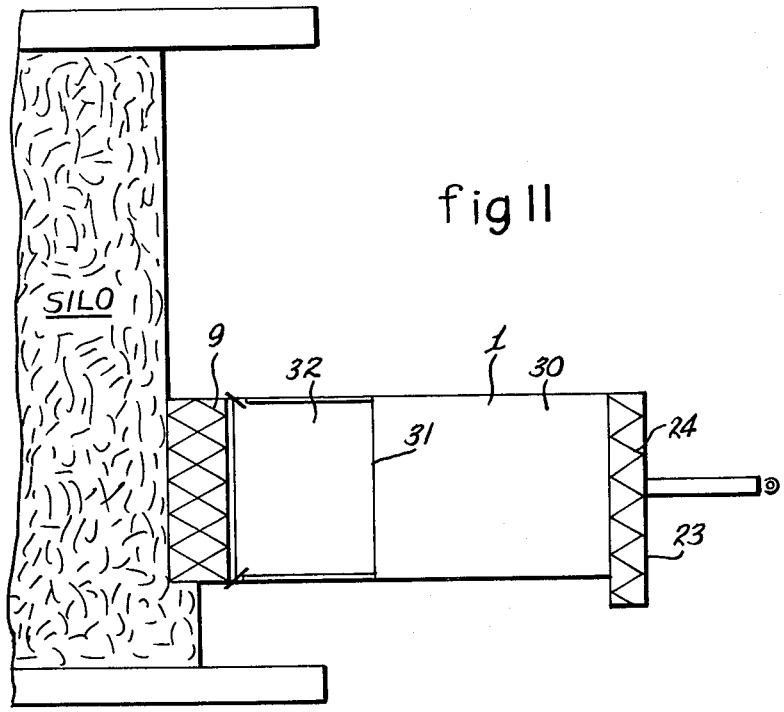
FIG. 11 is a schematic top view of the trailer.
Figure 12:
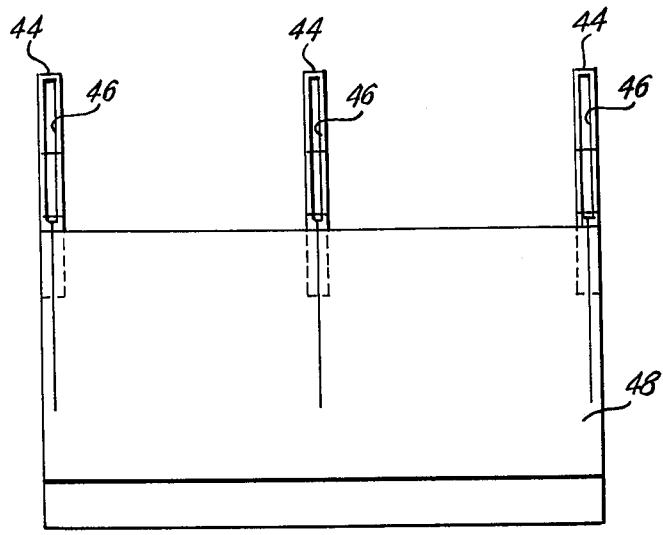
FIG. 12 is a more detailed view of a portion of a deflector assembly.
Figure 13:
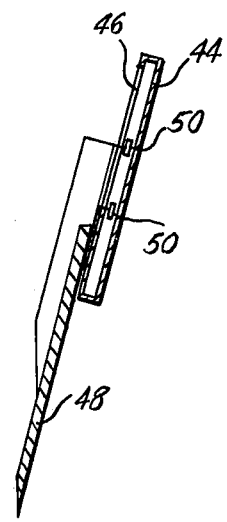
FIG. 13 is a vertical sectional view of the deflector of FIG. 12.

In this form of the invention, however, the vehicle body 1 defines the same type of enclosure already described but is provided with a fixed cover 30 over one end portion thereof. Hinged to the free edge of the cover 30, by hinge 31, is a further cover plate or chute 32 having generally triangular shaped side plates 34 depending from the edges thereof. The hinged plate 32 is of such length and width that it will rest on the upper edge of the enclosure 1, extending between the side posts of the doorway and the frame members and jacks mounted thereon, with side plates 34 inside the enclosure when in its lowermost position, as shown in FIG. 10.

Figure 9:
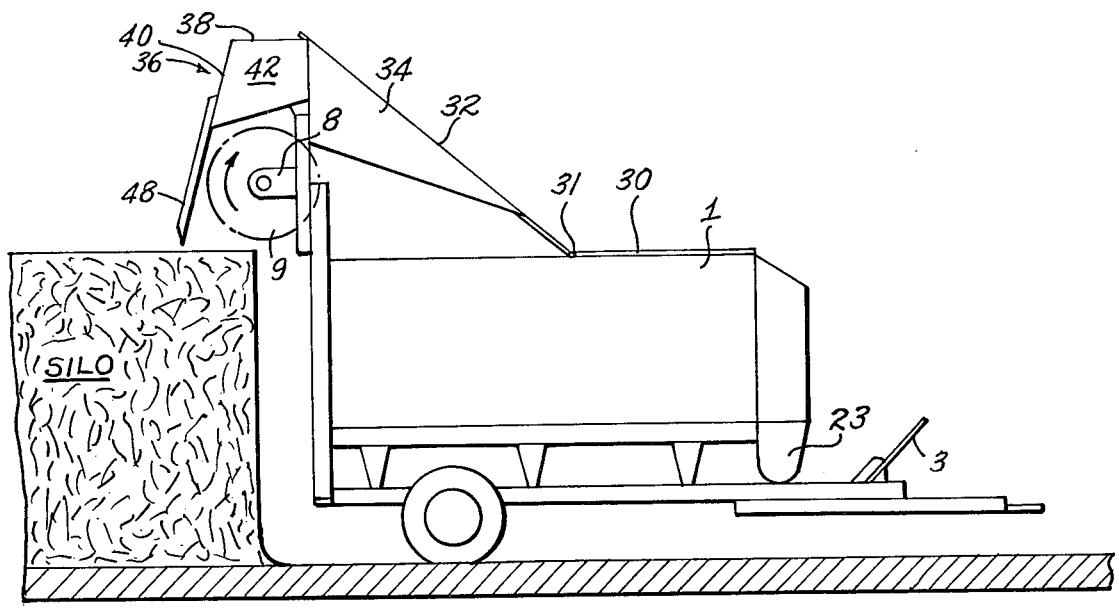
FIG. 9 is a schematic side view illustrating a further embodiment of the invention.

Fixed to the support 8 and movable vertically with that support and the rotor 9 is a hood generally designated at 36 and comprising a top wall 38, a front wall 40 and side walls 42. As will be apparent, the hood 36 rises and falls with the rotor 9 and its support 8. The plate 32 previously referred to is of sufficient length to engage the top wall 38 of the hood 36 when the latter is in its uppermost position, as shown in FIG. 9. The vertical movement of the support 8 and rotor 9 has been previously described with respect to FIG. 1. Though not shown in FIGS. 9 through 13, the side posts of the doorway 4, the frame member 5, the jacks 6, the side rails 7, the pulleys 15, and the cable 13 are part of the embodiment illustrated therein and their manner of operation is the same as previously described.

The front wall portion 40 of the hood 36 supports a plurality of hollow sloping guide members 44 having elongated slots 46 in the fronts thereof. A deflector plate 48 is provided with guide pins 50 extending slidably into the slots 46 whereby the deflector plate is vertically slidable in a plane generally parallel to the front wall 40. Thus, in operation, the apparatus may be in the position shown in FIG. 9 wherein the deflector plate 48 has dropped by gravity to its lowermost position wherein it covers the front face of the rotor 9 and extends downwardly to a region about even with the bottom thereof. When the rotor 9 is caused to rotate in the direction of the arrow and the support 8 and rotor 9 are slowly lowered, the rotor will pick up material from the silo and since it is covered by the hood 36 and plate 48, that material will be thrown upwardly into the hood 36 and deflected downwardly into the enclosure in vehicle body 1. The side plates 34 and 42 prevent the deflected material from moving laterally and dropped on the ground alongside the vehicle. They function to assist in directing the material into the enclosure.

When the support 8 and rotor 9 are first lowered from the position of FIG. 9, the lowermost edge of the deflector plate 48 engages the upper surface of the silo but does not substantially penetrate the same. As the rotor and hood 36 are lowered from that position, the plate 48 slides upwardly and inwardly in its guides 44 until its lower edge reaches the vertical surface formed on the silo material by operation of rotor 9 and the plate 48 can then descend along that surface as illustrated in FIG. 10 to continue effective as a deflector for the upwardly thrown material. As is evident from the figures, the lowering of the hood 36 along with support 8, causes the hinged plate 32 to swing downwardly and follow the same to the position of FIG. 10. When the rotor 9 continues downwardly from the position of FIG. 10, the plate 32 remains stationary as a cover for the vehicle enclosure but the deflector plate 48 continues to move downwardly and is continually effective to deflect material upwardly and inwardly into the enclosure.

It is contemplated that this form of the invention also be provided with the means defining transverse groove 23 and the helical conveyor 24 therein as already described with reference to FIGS. 7 and 8.

As shown from the above description of preferred embodiments of the invention, the latter may be used in all cases where the loading, the unloading and the distribution of a product in or from a single vehicle has to be carried out without the help of any other apparatus or of the need for any labor.

The invention is particularly useful in picking up food intended for animals either from the pasture itself or in a stocking silo to be thereafter distributed into the feeding-troughs.

1. In self-loading and self-unloading apparatus comprising a vehicle having a bottom and enclosure-forming side walls, an open top portion at one end of said vehicle and a horizontal endless conveyor extending along said bottom wall, the improvement comprising:
   an upright frame mounted on said vehicle at said one end thereof;
   support means mounted on said frame for vertical displacement therealong;
   rotary pick-up means mounted on said support means and arranged to pick up products and throw the same upwardly;
   a fixed cover over the top portion at the other end of said vehicle; and
   a guiding chute means over said open top portion and said support means and rotary pick-up means and positioned to deflect said upwardly thrown products through said open top portion into said enclosure, said guiding chute means comprising a hood and a cover plate;
   said hood fixed to said support means and movable vertically with said support means and said rotary pick-up means;
   said cover plate hinged to said fixed cover and extending over said open top portion so as to be slidably supported on said hood.

2. Apparatus as defined in claim 1 wherein said vehicle includes laterally spaced posts on which said upright frame is slidably mounted;
   power means for vertically displacing said frame along said posts;
   a pulley mounted on said frame; and
   cable means having one end secured on said laterally spaced posts, the other end secured on said support means and the bight wound around said pulley so as to cause relative vertical displacement of said frame and support means when said frame is moved by said power means.

3. Apparatus as defined in claim 2 wherein said vehicle further includes:
   a horizontal trough at the bottom of said enclosure, extending transversely thereof, at said other end and contiguous to the adjacent end of said horizontal conveyor to receive products discharged from said horizontal conveyor; and
   a screw conveyor at the bottom of said trough to discharge products from said trough, laterally of said enclosure, through an opening in one of said side walls in alignment with an end of said trough.

4. Apparatus as defined in claim 1 wherein said hood comprises a top wall, a front wall and side walls and wherein said cover plate is slidably supported on said top wall.

5. Apparatus as defined in claim 1 wherein said cover plate has side plates depending from the edges thereof, said side plates positioned inside the enclosure-forming side walls when the hood is in its lowermost position;
   said side walls and said side plates directing the deflected products into the enclosure and preventing the deflected products from moving laterally and outside said enclosure.

* * * * *